(12) United States Patent
Zeng et al.

(10) Patent No.: US 6,778,410 B2
(45) Date of Patent: Aug. 17, 2004

(54) DC-TO-DC CONVERTER

(75) Inventors: Jianhong Zeng, Taoyuan Sien (TW); Jianping Ying, Taoyuan Sien (TW); Qingyou Zhang, Taoyuan Sien (TW)

(73) Assignee: Delta Electronics, Inc., Taoyuan Sien (TW)

( * ) Notice: Subject to any disclaimer, the term of this patent is extended or adjusted under 35 U.S.C. 154(b) by 63 days.

(21) Appl. No.: 10/283,740

(22) Filed: Oct. 30, 2002

(65) Prior Publication Data

US 2003/0086282 A1 May 8, 2003

(30) Foreign Application Priority Data

Nov. 2, 2001 (TW) .......................................... 90127324

(51) Int. Cl.[7] .............................................. H02M 3/335
(52) U.S. Cl. ........................................ 363/16; 363/97
(58) Field of Search .............................. 363/15, 16, 24, 363/25, 84, 89, 95, 97, 125, 127, 131

(56) References Cited

U.S. PATENT DOCUMENTS

| | | | | |
|---|---|---|---|---|
| 4,025,863 A | * | 5/1977 | Higuchi et al. ................ 363/25 |
| 4,553,199 A | * | 11/1985 | Harada et al. ................ 363/75 |
| 4,823,249 A | * | 4/1989 | Garcia, II ..................... 363/48 |
| 6,064,580 A | * | 5/2000 | Watanabe et al. ............. 363/17 |
| 6,426,884 B1 | * | 7/2002 | Sun .............................. 363/17 |
| 6,618,274 B2 | * | 9/2003 | Boylan et al. ................ 363/17 |

* cited by examiner

*Primary Examiner*—Adolf Berhane
(74) *Attorney, Agent, or Firm*—Thomas, Kayden, Horstemeyer & Risley

(57) ABSTRACT

A DC-to-DC converter. The converter has three inductors, two capacitors, a first switch and a second switch, a first rectifier and a second rectifier, and a transformer with a primary winding and a secondary winding. The first switch and the second switch are turned on alternately according to a controlling signal, and a current may flow through the primary winding of the transformer, thereby transferring energy to the second winding. The first rectifier and the second rectifier operate according to the energy transferred from the primary winding to obtain a solid current through the third inductor, and a solid DC output voltage is output to the load.

30 Claims, 12 Drawing Sheets

US 6,778,410 B2

DC-TO-DC CONVERTER

BACKGROUND OF THE INVENTION

1. Field of the Invention

The present invention relates in general to a power converter. In particular, the present invention relates to a DC-to-DC converter with high efficiency and power density.

2. Description of the Related Art

FIG. 1 shows a resonant reset dual switch forward DC-to-DC converter. In the converter 10, a switch Q101 turns on to divide the DC input voltage into square wave voltage according to a predetermined duty ratio. The square wave voltage is then transformed to secondary winding of the transformer T101, and is rectified into a DC voltage to output to load by a rectifying device composed of an inductor L101 and a capacitor C101. The converter needs a large input rectifying device and an output rectifying device because the converter has a non-continuous input current and a large output voltage ripple.

Consequently, the size and cost of the converter may increase. In addition, the transformer T101 is reset by the inductor L101 and the capacitor C101 such that the voltage stress of the switch Q101 is very high, and also has high electromagnetic interference (EMI) because the converter Q101 usually operates in a hard switching condition.

FIG. 2 shows a DC-to-DC converter 20 with a synchronous rectifying resonant reset forward circuit. The converter 10 shown in FIG. 1 may have a low power efficiency due to consumption of diodes D101 and D102 when the converter 10 is applied to low input voltage, for example below 12 volts. As shown in FIG. 2, the diodes D101 and D102 of the converter 20 are replaced by synchronous rectifiers Q102 and Q103 to increase power efficiency. The synchronous rectifiers Q102 and Q103 are driven by the induced voltage across the secondary winding N102 of the transformer T101.

FIG. 3 illustrates the key operating waveform of the converter 20 shown in FIG. 2. As shown in FIG. 3, the first synchronous rectifier Q102 is always turned on when the switch Q101 is turned on (t1 to t2), and the synchronous effect is ideal. The second synchronous rectifier Q103, however, is not turned on when the switch Q101 is turned off (t3 to t4), thus the synchronous effect is less than ideal. This problem may affect whole efficiency of the converter 20 when the converter is applied to low output voltage. Although the converter 20 has a simple structure, the synchronous effect is not ideal, and the input current ripple and the output voltage ripple are high. Thus, the converter 20 also needs a large rectifier.

SUMMARY OF THE INVENTION

It is an object of the invention to provide a novel and improved DC-to-DC converter that can overcome the above-mentioned disadvantages of the related art.

In the present invention, the converter has three inductors, two capacitors, a first switch and a second switch, a first rectifier and a second rectifier, and a transformer with a primary winding and a secondary winding.

The first switch and the second switch are turned on alternately according to a controlling signal, and a current may flow through the primary winding of the transformer thereby transferring energy to the second winding. The first rectifier and the second rectifier operate according to the energy transferred from the primary winding to obtain a solid current through the third inductor, and a solid DC output voltage is output to the load.

DETAILED DESCRIPTION OF THE INVENTION

[The First Embodiment]

Figure 1:
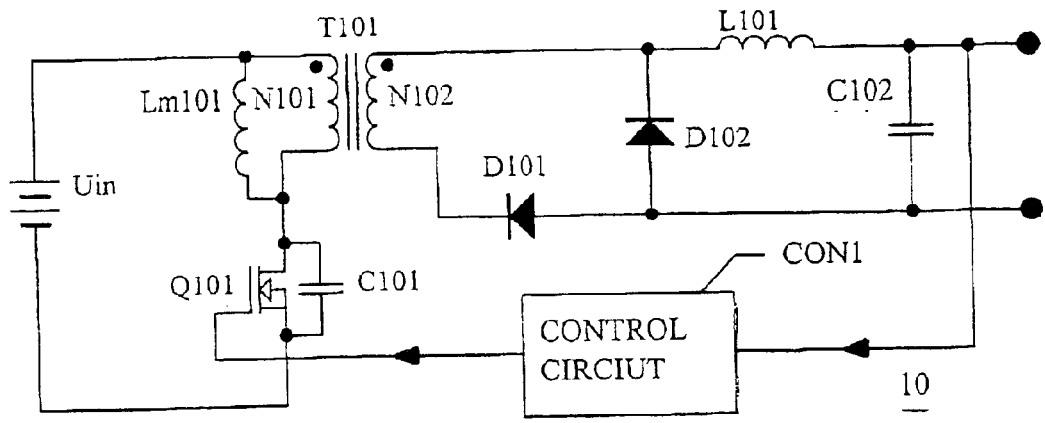
FIG. 1 shows a resonant reset dual switch forward DC-to-DC converter.
Figure 2:
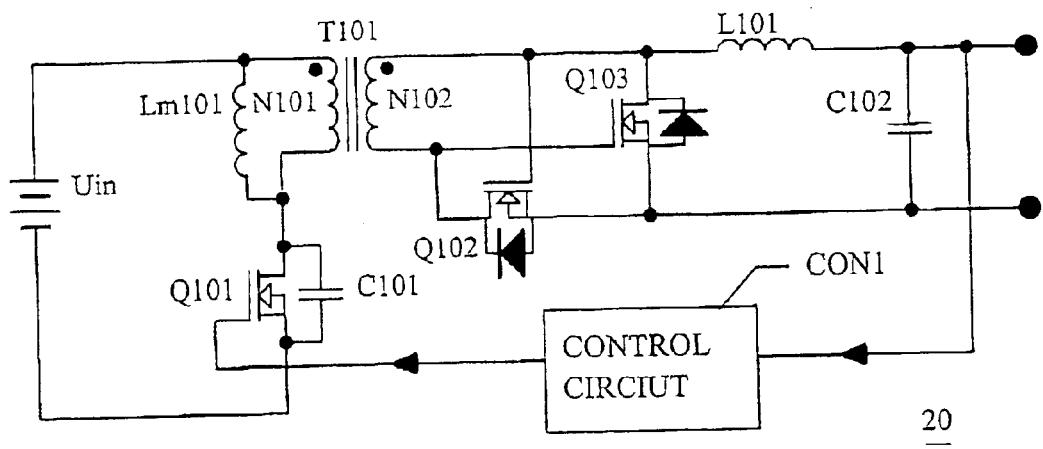
FIG. 2 shows a DC-to-DC converter with a synchronous rectifying resonant reset forward circuit.
Figure 3:
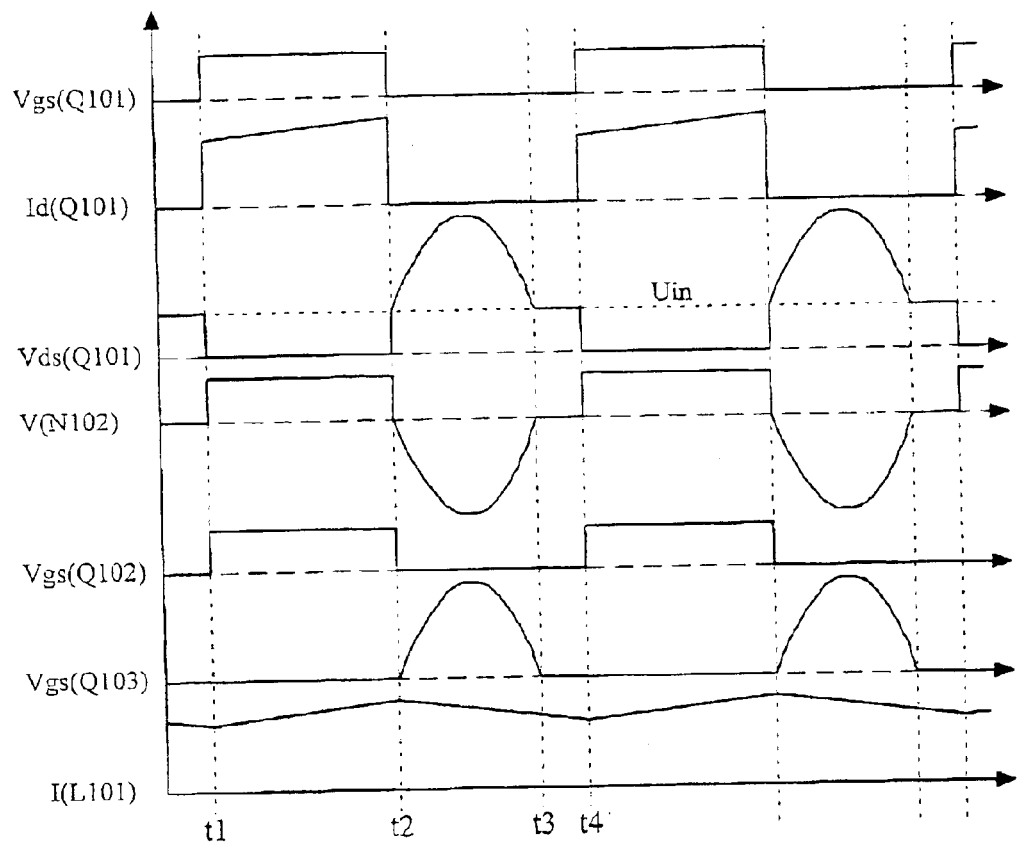
FIG. 3 illustrates the key operating waveform of the converter of FIG. 2.
Figure 4:
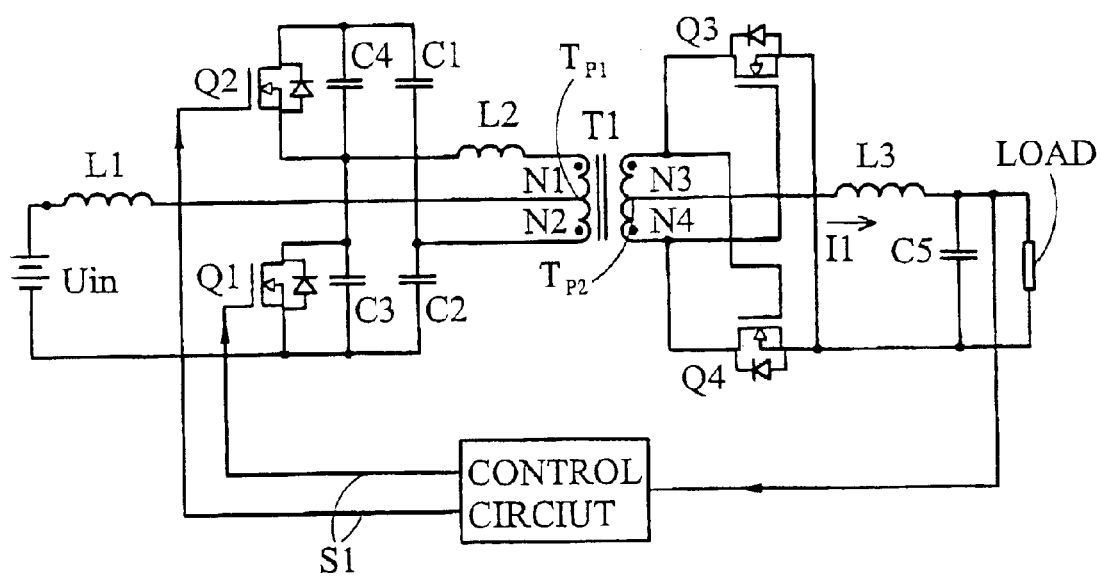
FIG. 4 shows a DC-to-DC converter of the present invention.

The present invention provides a DC-to-DC converter 40, also called a tapping transformer boost half bride DC-to-DC converter. As shown in FIG. 4, the DC-to-DC converter 40 of the present invention has three inductors L1~L3, two capacitors C1~C2, a first switch Q1 and a second switch Q2, a first rectifier Q3 and a second rectifier Q4, and a transformer T1 having a primary winding and a secondary winding, and each primary winding and secondary winding has two ends and a tapper (Tp1 and Tp2). The first winding has a first primary winding N1 and a second primary winding N2, and the second winding has a first secondary winding N3 and a second secondary winding N4. Each of the switches Q1~Q2 and the rectifiers Q3~Q4 has a MOS transistor and a parasitical diode, and the first switch Q1 and second switch Q2 operate according to a control signal S1. A DC input voltage Uin, for example is a battery or an external DC voltage source.

The first terminal of the first switch Q1 is connected to the second terminal of the second switch Q2, a first end of the first capacitor C1 is connected to the first end of the second switch Q2, and the second end of the first capacitor C1 is connected to a first end of the second capacitor C2. A second end of the second capacitor C2 is connected to the second terminal of the first switch Q1, and the first end of the second capacitor C2 is connected to the second end of the primary winding (N1 and N2). Two ends of the first inductor L1 are connected between the DC input voltage Uin and the tapper Tp1 of the primary winding (N1 and N2), and two ends of the second inductor L2 are connected between the second end of the second switch Q2 and the first end of the primary winding (N1 and N2).

The first rectifying device Q3 has a first terminal connected to the first end of the secondary winding (N3 and N4), and a control terminal connected to the second end of the second winding. The second rectifying device Q4 has a first terminal connected to the second end of the secondary winding, a control terminal connected to the first end of the secondary winding, and a second terminal connected to the second terminal of the first rectifying device Q3. The output capacitor C5 has a first end connected to the second terminal of the first rectifying device Q3, and a second end. The output capacitor C5 smoothes down the output voltage of the converter. Two ends of the third inductor L3 are connected to the tapper Tp2 of the secondary winding (N3 and N4) and the first end of the output capacitor C5.

Figure 5:
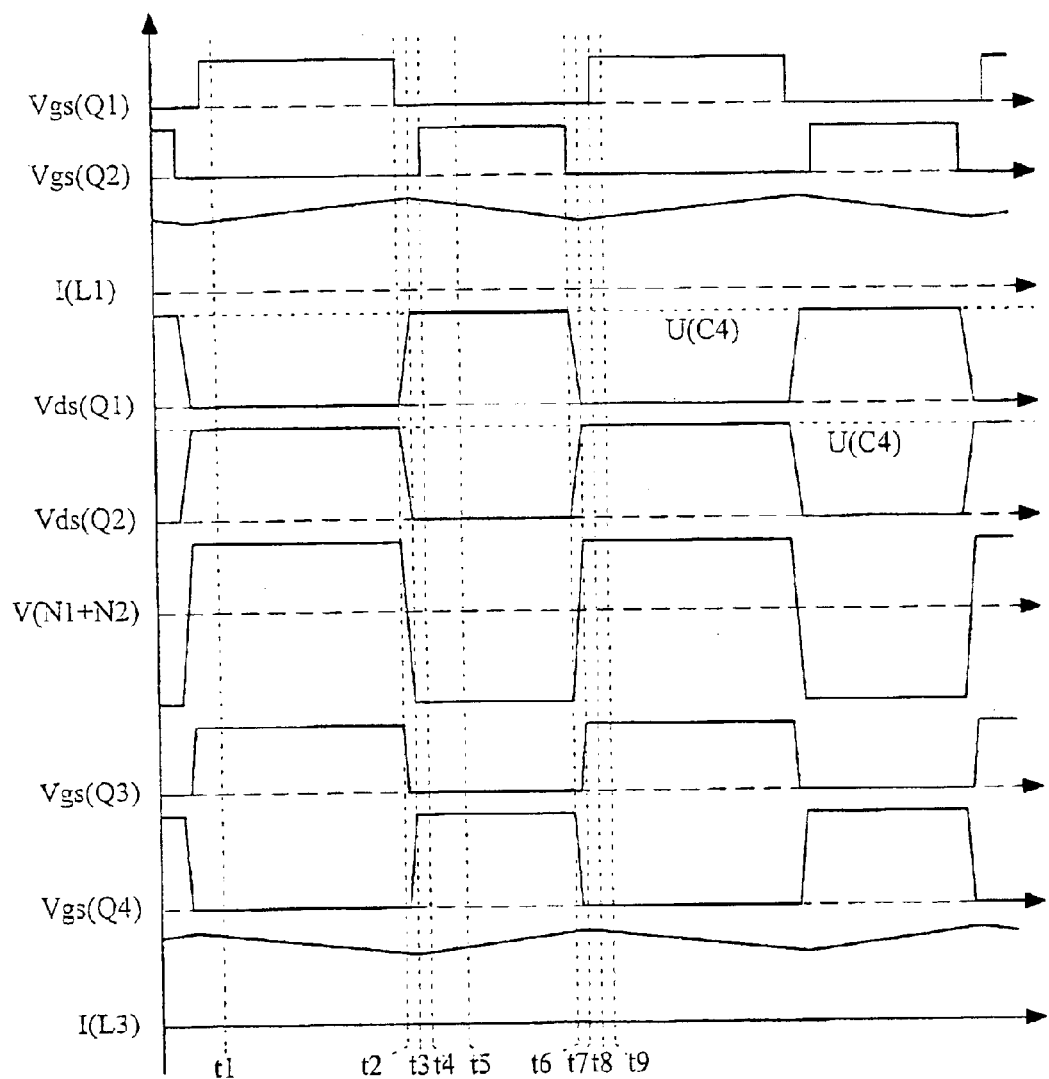
FIG. 5 shows operating wave of the DC-to-DC converter 40 of the present invention.

The operating wave of the DC-to-DC converter 40 of the present invention is shown in FIG. 5, the first switch Q1 and the second switch Q2 are turned on alternately, and the converter of the present invention has eight operating modes in one period.

Steady-state Analysis of DC-to-DC converter of the present invention is performed as shown in FIG. 4 and FIG. 5. As to loop Uin-L1-N2-C2-Uin, because the average voltage across the inductor L1 and the second primary winding N2 in steady-state operating must be zero, the voltage $V_{C2}$ across the second capacitor C2 may equal the DC input voltage Uin. As to loop Uin-L1-N2-L2-Q1-Uin, the duty ratio is assumed to be $D_{Q1}$. Because the average voltage across the first inductor L1, the second primary winding N2 and the second inductor L2 in steady-state operating must be zero, the relation between the voltage $U_{C1}$ across the first capacitor C1 and DC input voltage Uin may equal the relation between the output voltage and the input voltage of the converter 40 shown in FIG. 4 when the first switch Q1 is turned off. That is $$U_{C1} = \frac{Uin}{1 - D_{Q1}} \quad (1)$$

[1] t1<t<t2

Figure 9A:
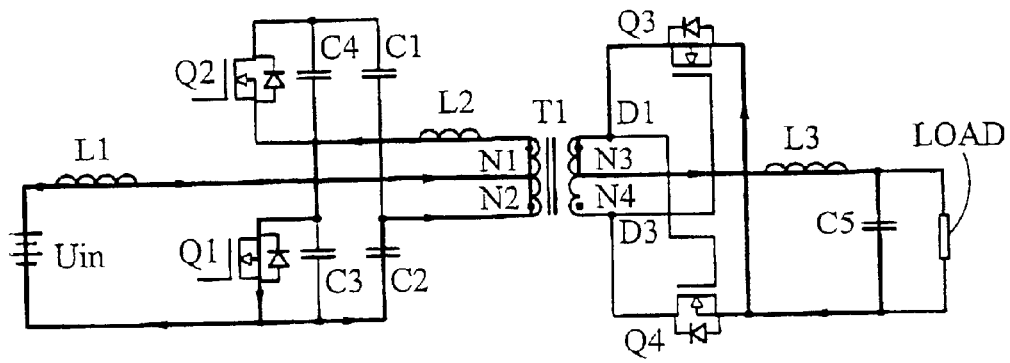
FIGS. 9A~9H illustrate Operation of the converter shown in FIG. 4.

As shown in FIG. 9A, the first switch Q1 is turned on and the second switch Q2 is turned off, the DC input voltage Uin stores energy into the first inductor L1 through loop Uin-L1-N1-L2-Q1-Uin, and the voltage $V_{C2}$ stored in the second capacitor C2 may discharge through loop C2-N2-N1-L2-Q1-C2 to transform energy to the secondary winding (N3 and N4). At this time, the first secondary winding N3 induces a positive voltage to turn on the first rectifying device Q3 and to feed energy to the load.

In this time interval, the voltage across the first inductor L1 is $$V(L_1) = \frac{Uin \times N_2}{N_1 + N_2} = \frac{Uin \times N_2}{n_1} \quad (2)$$

The positive voltage induced across the first secondary winding N3 of the transformer T1 is $$V(N_3) = \frac{Uin \times N_3}{N_1 + N_2} = \frac{Uin \times N_3}{n_1} \quad (3)$$

The driven voltage of the first rectifying device Q3 is $$Vgs(Q_3) = \frac{Uin \times (N_3 + N_4)}{N_1 + N_2} = \frac{Uin \times n_2}{n_1} \quad (4)$$

where n1=N1+N2, and n2=N3+N4.

[2] t2<t<t3

Figure 9B:
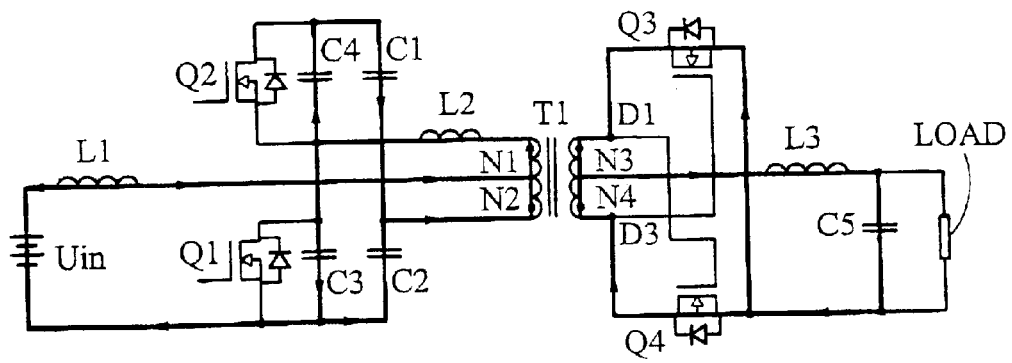

As shown in FIG. 9B, in this time interval, both the first switch Q1 and the second switch Q2 are turned off, and the second rectifying device Q3 and the fourth rectifying device Q4 are turned on, and the secondary winding (N3 and N4) feeds energy to the load. The drain-to-source voltage Vds (Q1) of the first switch Q1 is increased slowly due to the third capacitor C3 and the fourth capacitor C4, such that the switching loss of the first switch Q1 is minimized. Thus, the first switch Q1 is turned off in soft switching condition.

[3] t3<t<t4

Figure 9C:
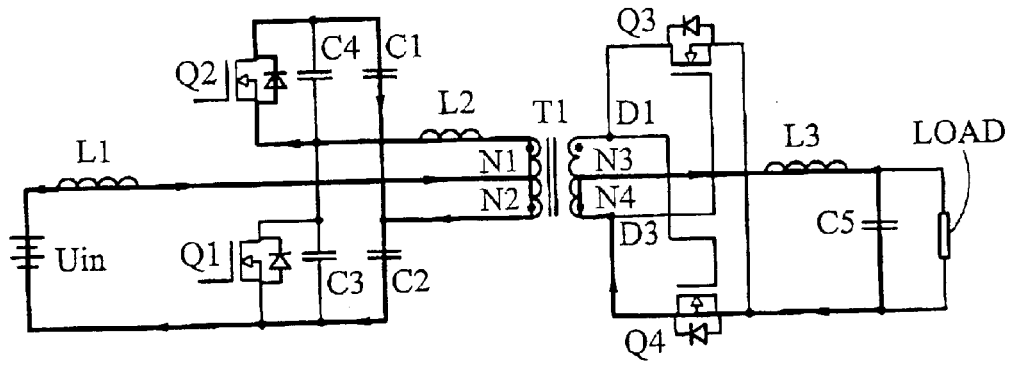

As shown in FIG. 9C, both the first switch Q1 and the second switch Q2 are turned off, the voltage $V_{C3}$ across the third capacitor C3 increases to be clamped to the voltage $V_{C1}$ such that the parasitic diode of the second switch Q2 is turned on. At this time, one portion of the energy stored in the first inductor L1 charges the first capacitor C1 through loop L1-N1-L2-Q2-C1-C2-Uin-L1, and the other portion transforms to the secondary winding (N3 and N4) through the loop L1-N2-C2-Uin-L1. At the same time, the second secondary winding N4 induces a positive voltage to feed energy to the load.

In the time interval, the voltage difference between the voltage $V_{C1}$ and the voltage $V_{C2}$ of the primary winding of the transformer T1 is $$V(N_1 + N_2) = V_{C1} - V_{C2} = \frac{Uin}{(1 - D_{Q1})} = \frac{Uin \times D_{Q1}}{(1 - D_{Q1})} \quad (5)$$

The voltage stored in the first inductor L1 is $$V(L_1) = \frac{N_2}{N_1 + N_2} \times V(N_1 + N_2) = \frac{N_2}{n_1} \times \frac{D_{Q1} \times Uin}{1 - D_{Q1}} \quad (6)$$

The voltage induced across the second secondary winding N4 of the transformer T1 is $$V(N_4) = \frac{N_4}{N_1 + N_2} \times \frac{D_{Q1} \times Uin}{1 - D_{Q1}} = \frac{N_4}{n_1} \times \frac{D_{Q1} \times Uin}{1 - D_{Q1}} \quad (7)$$

The driven voltage of the second rectifying device Q4 is $$Vgs(Q_3) = \frac{(N_3 + N_4)}{N_1 + N_2} \times \frac{D_{Q1} \times Uin}{1 - D_{Q1}} = \frac{n_2}{n_1} \times \frac{D_{Q1} \times Uin}{1 - D_{Q1}} \quad (8)$$

[4] t4<t<t5

Figure 9D:
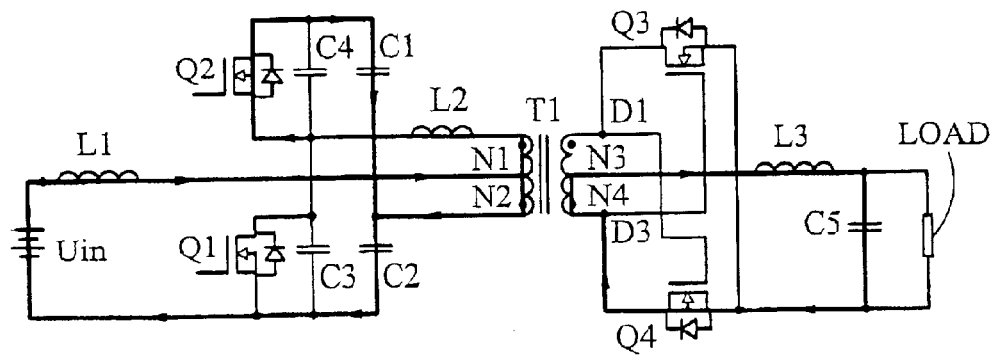

As shown in FIG. 9D, the first switch Q1 is turned off, and the second switch Q2 is turned on under a zero voltage condition because the parasitic diode of the second switch Q2 has turned on. The energy stored in the first inductor L1 charges the first capacitor C1 through the loop L1-N1-L2-Q2-C1-C2-Uin-L1.

[5] t5<t<t6

Figure 9E:
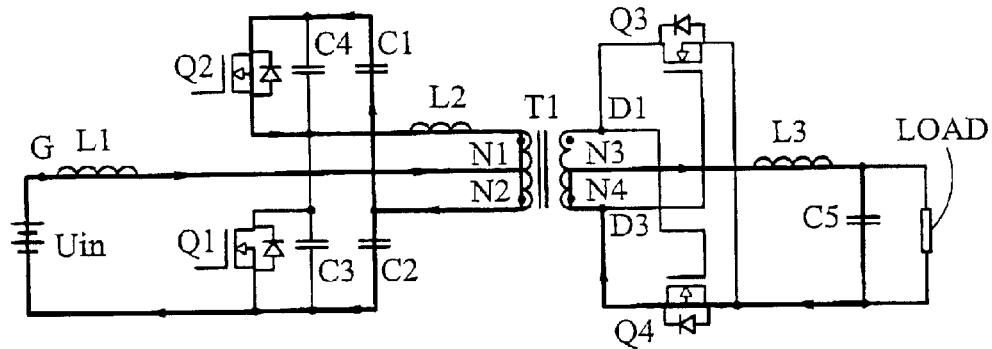

As shown in FIG. 9E, the first switch Q1 is turned off, and the second switch Q2 is turned on. The energy stored in the inductor L1 does not offer to the secondary winding (N3 and N4), and the voltage $V_{C1}$ across the first capacitor C1 may discharge through the loop C1-Q2-L2-N1-N2-C2-C1 to feed energy to the secondary winging of the transformer T1.

[6] t6<t<t7

Figure 9F:
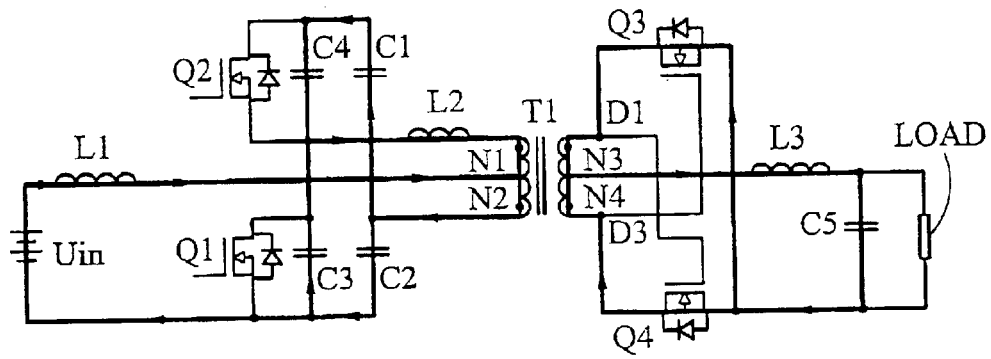

As shown in FIG. 9F, both the first switch Q1 and the second switch are turned off. The drain-to-source voltage Vds(Q2) of the second switch Q2 is increased slowly due to the third capacitor C3 and the fourth capacitor C4, such that the switching loss of the second switch Q2 is minimized. Thus, the second switch Q2 is turned off in a soft switching condition.

[7] t7<t<t8

Figure 9G:
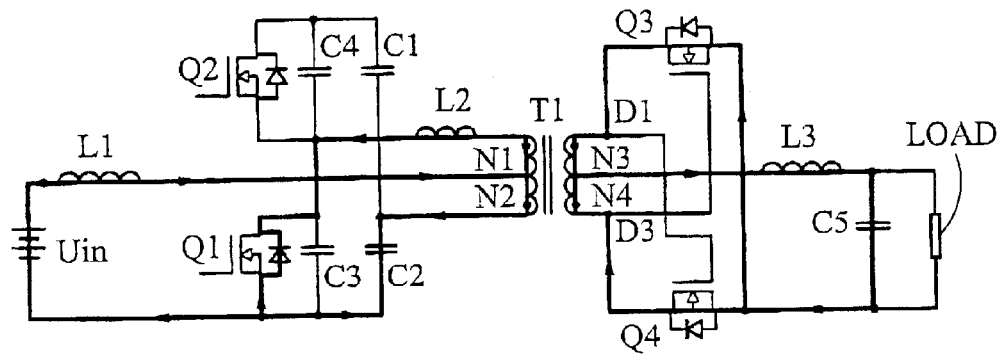

As shown in FIG. 9G, both the first switch Q1 and the second switch Q2 are turned off. The parasitic diode of the second switch Q2 is turned on because the inductor current may flow continuously and the voltage VC3 across the third capacitor C3 may discharge to zero.

[8] t8<t<t9

Figure 9H:
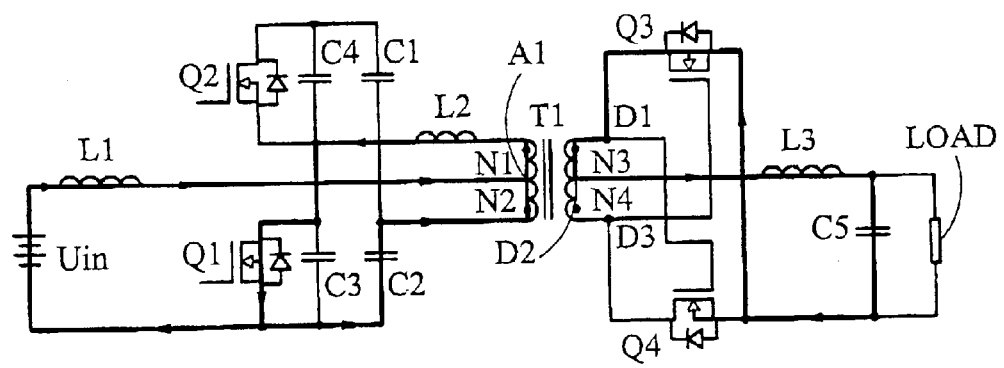

As shown in FIG. 9H, the first switch Q1 is turned on under zero voltage condition and the second switch Q2 is turned off. One operating period of the circuit shown in FIG. 4 is disclosed above. In the circuit, the total turns of the primary winding and of the secondary winding are n1 and n2 respectively. From the mentioned above, the output voltage is $$V(C_5) = V(N_3) \times D_{Q1} + V(N_4) \times (1 - D_{Q1}) \quad (9)$$

$$= \frac{N_3}{n_1} + Uin \times D_{Q1} + \frac{N_4}{n_1} \times \frac{D_{Q1} \times Uin}{1 - D_{Q1}}(1 - D_{Q1})$$

$$= \frac{N3 + N4}{n1} \times D_{Q1} \times Uin$$

$$= \frac{n2}{n1} \times D_{Q1} \times Uin$$

Therefore, the duty ratio $D_{Q1}$ of the switch Q1 can be designed to exceed 50% in the present invention, and the output voltage V(C5) only relates to the total number of turns of the primary winding and the secondary winding of the transformer T1, but not to the tapping point of the transformer T1.

Voltage-second across the first inductor L1 is $$VS = \frac{Uin \times N_2}{n_1} \times D_{Q1} \times \frac{1}{fs} \quad (10)$$

Consequently, the voltage stress of the first inductor L1 may equal voltage-second and relates to the tapping position of the transformer T1, namely the turns of the second primary winding N2. That is to say, the voltage stress (voltage-second) of the first inductor L1 can be adjusted by adjusting the tapping position of the transformer T1. The voltage stress of the first inductor L1 is increased as the turns of the second primary winding N2 increase, and vice versa.

Figure 6:
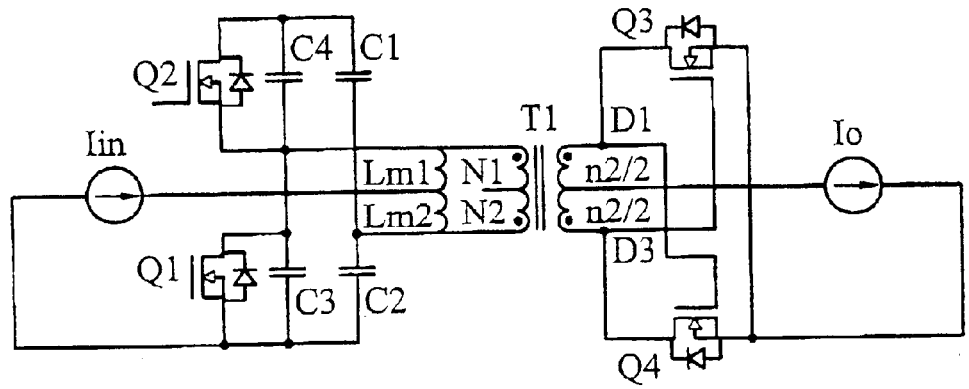
FIG. 6 shows the analysis mode of the DC-to-DC converter shown in FIG. 4.

FIG. 6 shows the analysis mode of the converter 40 shown in FIG. 4. As mentioned above, the induced voltage of the primary winding (N1 and N2) does not relate to the turns of the first primary winding N1 or to the second primary winding N2. That is to say, the voltage-seconds of the primary winding (N1 and N2) does not relate to the connection position in which the first inductor L1 connects to the primary winding of the transformer T1. Briefly, it assumes that both the input current Iin and output current Io are DC current, and turns of the first secondary winding N3 equal to the second secondary winding N4 (N3=N4=n2/2), and the transform efficiency of the converter 40 is 100%, therefore input current is $$I_{in} = \frac{n_2}{n_1} \times D_{Q1} \times I_0 \quad (11)$$

As shown in FIG. 6, inducing inductors Lm1 and Lm2 correspond to the first primary winding N1 and the second primary winging N2 respectively. Because the capacitors C3 and C4 cannot have any DC component, such that the DC current component through the inducing inductor Lm2 equals that through the primary winging (N1 and N2), namely $$I(L_{m2}) = \frac{\frac{n_2}{2}}{n_1} \times (2D_{Q1} - 1) \times I_0 = \frac{n_2}{2n_1} \times (2D_{Q1} - 1) \times I_0 \quad (12)$$

Consequently, the DC current component through the inducing inductor Lm1 equals the difference between the DC current component through the inducing inductor Lm2 and the input current Iin, namely $$I(L_{m1}) = I(L_{m2}) - I0 = \frac{n2}{2n1} \times (2D_{Q1} - 1) \times I0 - \frac{n2}{n1} \times D_{Q1} \times I0 \quad (13)$$

$$= \frac{n2}{2n1} \times Io$$

Therefore, the ampere turns of the induced inductors of the transformer T1 is $$I(m1) \times N1 + I(m2) \times N2 = \frac{n2}{2n1} \times I0 \times N1 + \frac{n2}{2n1} \times (2D_{Q1} - 1) \times I0 \times N2 \quad (14)$$

$$= \frac{n2}{2n1} \times I0 \times (N1 + (2D_{Q1} - 1) \times N2)$$

$$= \frac{n2}{2n1} \times I0 \times (n1 - 2N2 \times (1 - D_{Q1}))$$

As mentioned above, the ampere turns of the inductors (Lm1 and Lm2) of the transformer can be minimized by adjusting the connection position of the first inductor L1 and the primary winding (N1 and N2) of the transform T1 according to different duty ratio.

Therefore, the present invention has many advantages as follows:

1. Driving the output synchronous rectifying devices is easy and effective.
2. Adjustment of the voltage stress between the inductor and the transformer can be made by modifying the turns of the second primary winding N2, such that each magnetic element can operate in the best condition.
3. The duty ratio $D_{Q1}$ of the switches can be designed exceeding 50%, suitable for wide input voltage operations.
4. Switching loss of the switches is small because all switches of the circuit operate under a soft switching condition.
5. Only a small input inductor is needed because of operation under continuous current mode (CCM).
6. Only a small output inductor is needed because of the small output voltage ripple.

[The Second Embodiment]

Figure 7:
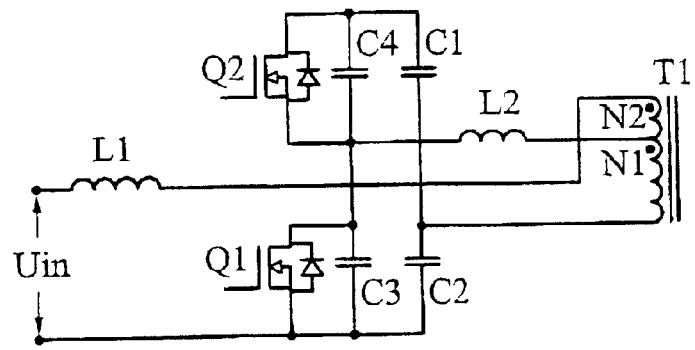
FIG. 7 shows another aspect of converter according to the second embodiment of the present invention.

As shown in FIG. 7, the first inductor L1 is connected between the second end of the transformer T1 and the DC input voltage Uin, and the second inductor L2 is connected between the tapper Tp1 of the transformer T1 and the second terminal of the second switch Q2, with other elements the same as shown in FIG. 4. In this embodiment, the voltage stress between the inductors and the transformer can be adjusted, and does not influence the output characteristic of the converter. The operation of the circuit is omitted because it is the same as shown in FIG. 4.

[The Third Embodiment]

Figure 8:
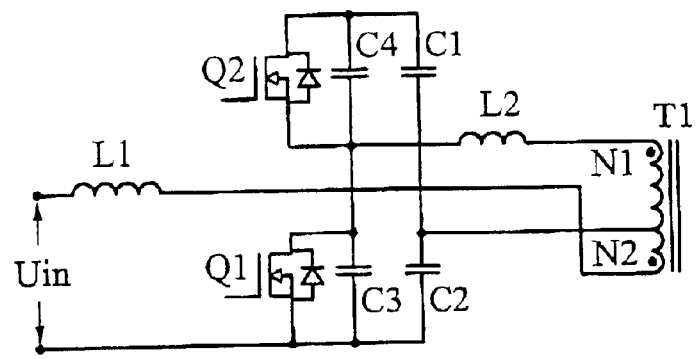
FIG. 8 shows another aspect of converter according to the third embodiment of the present invention.

As shown in FIG. 8, the first inductor L1 is connected between the second end of the transformer T1 and the input voltage Uin, the second inductor L2 is connected between the first end of the transformer T1 and the second terminal of the second switch Q2, one end of the second capacitor C2 is connected to the tapper Tp1 of the transformer T1, and other elements are the same as shown in FIG. 4. In this embodiment, the voltage stress between the inductors and the transformer can be adjusted, and does not influence the output characteristic of the converter. Operation of the circuit is omitted because it is the same as shown in FIG. 4.

[The Fourth Embodiment]

Figure 10:
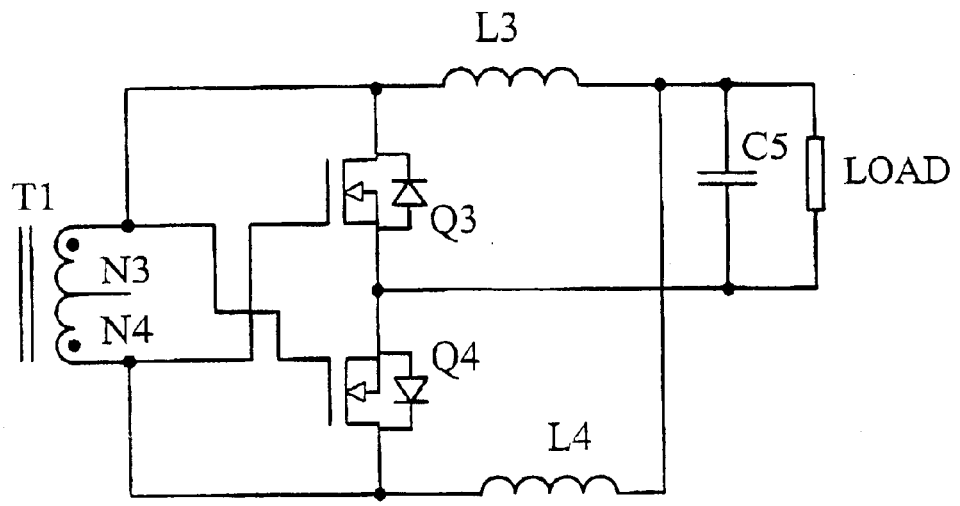
FIG. 10 shows another aspect of converter according to the fourth embodiment of the present invention.

As shown in FIG. 10, the third inductor L3 is connected between the first terminal of the first rectifying device Q3 and the output capacitor C5, the fourth inductor L4 is connected between the first terminal of the second rectifying device Q4 and the output capacitor C5, and other elements are the same as shown in FIG. 4. In this embodiment, the first rectifying device Q1, the second rectifying device Q2, the first inductor L3, the second inductor L4 and the secondary winding (N3 and N4) of the transformer compose a synchronous output current double rectification circuit, and the secondary winding (N3 and N4) does not need a tapper such that the transformer structure is simplified. Operation of the circuit is omitted because it is the same as shown in FIG. 4.

[The Fifth Embodiment]

Figure 11:
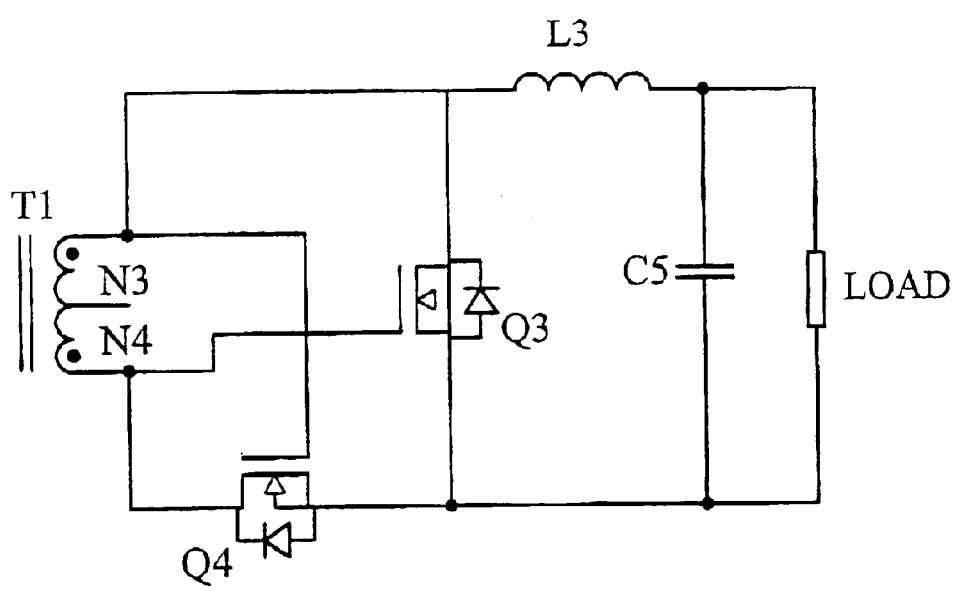
FIG. 11 shows another aspect of converter according to the fifth embodiment of the present invention.

As shown in FIG. 11, the third inductor L3 is connected between the first terminal of the first rectifying device Q3 and the output capacitor C5, and other elements are as the same as shown in FIG. 4. In those embodiments, the first rectifying device Q1, the second rectifying device Q2, the first inductor L3, and the secondary winding (N3 and N4) of the transformer compose a synchronous half-wave rectification circuit, and the secondary winding (N3 and N4) does not need a tapper such that the transformer structure is simplified. Operation of the circuit is omitted because it is the same as shown in FIG. 4.

[The Sixth Embodiment]

Figure 12A:
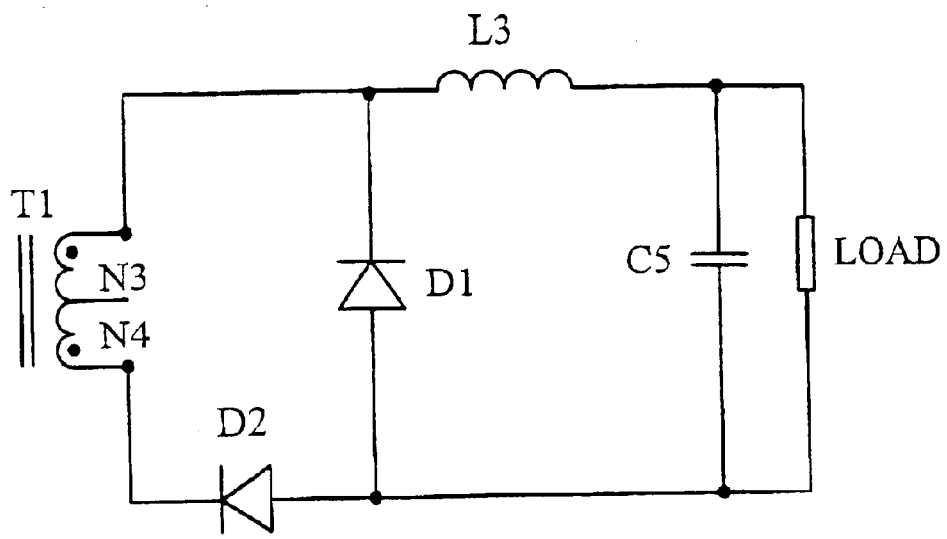
FIGS. 12A~12D show other aspects of the converter according to the present invention.
Figure 12B:
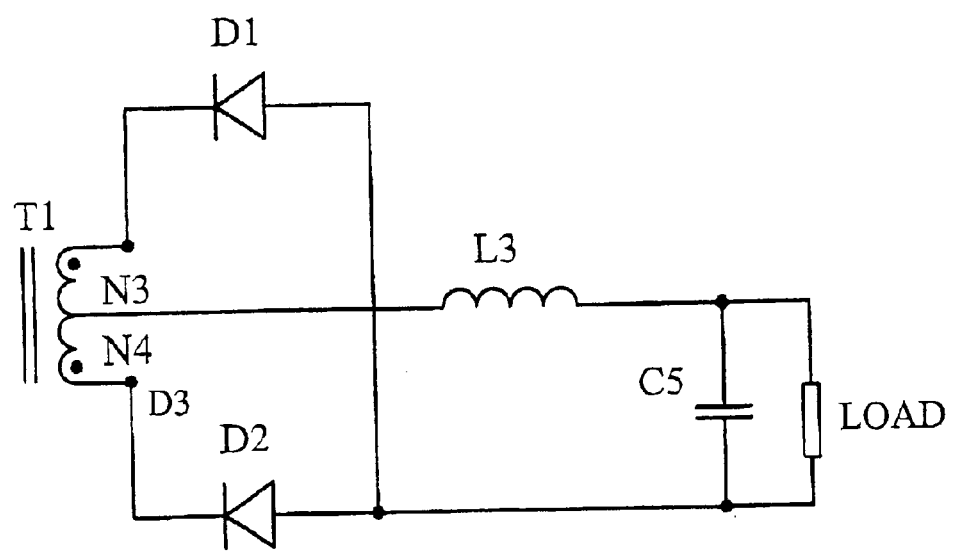
Figure 12C:
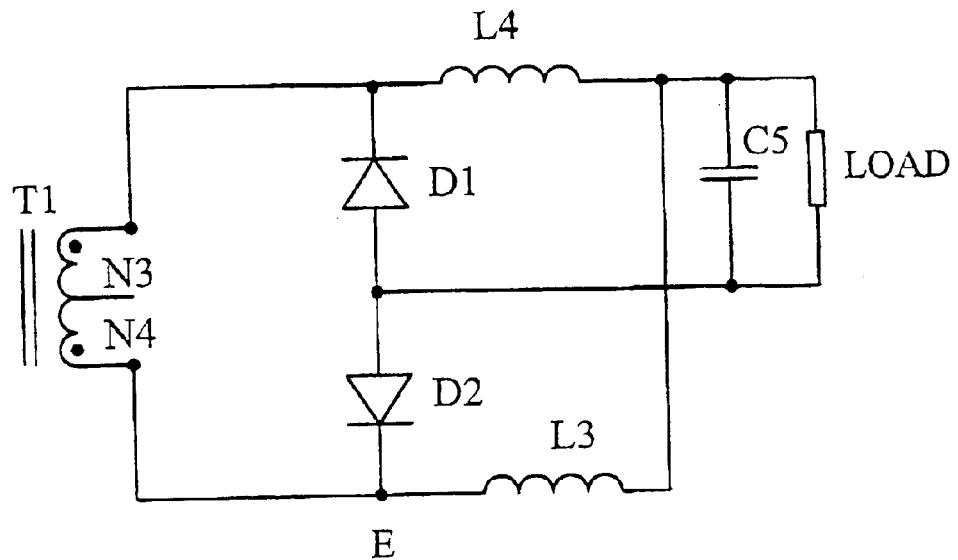

As shown in FIGS. 12A~12C, the first rectifying device Q3 and the second rectifying device Q4 replace the first diode D1 and the second diode D2, and other elements are as the same as shown in FIG. 4. In those embodiments, the first diode D1, the second diode D2, the first inductor L3, and the secondary winding (N3 and N4) of the transformer compose a non-synchronous rectification circuit, and the transformer structure is simplified and the cost of the whole converter is thus minimized. Operation of the converter shown in FIGS. 12A~12C is omitted because operation thereof is same as shown in FIG. 4.

Figure 12D:
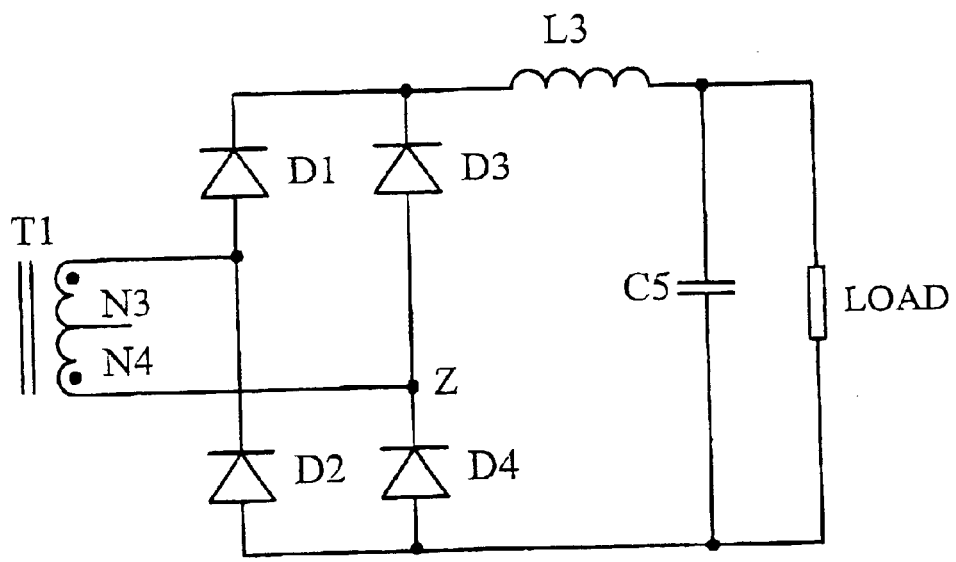
Figure 13A:
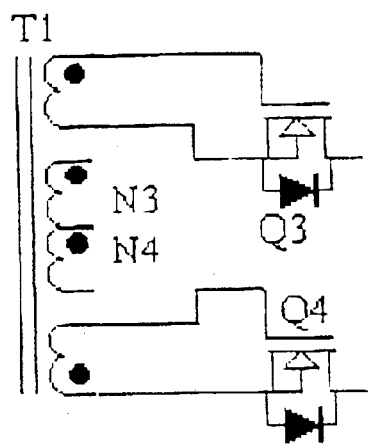
FIGS. 13A~13C show other aspects of the converter according to the present invention.
Figure 13B:
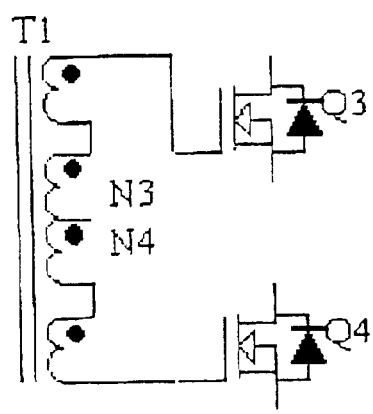
Figure 13C:
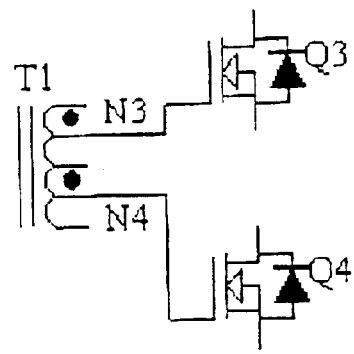

As shown in FIG. 12D, the first rectifying device Q3 and the second rectifying device Q4 replace the first diode D1 and the second diode D2, and further have a third diode D3 and a fourth diode D4, with other elements the same as shown in FIG. 4. In this embodiment, the first diode D1, the second diode D2, the third diode D3, the fourth diode D4, the first inductor L3, and the secondary winding (N3 and N4) of the transformer compose a non-synchronous rectification circuit, and the transformer structure is simplified and the cost of the whole converter is minimized. Operation of the converter shown in FIG. 12D is omitted because it is the same as shown in FIG. 4. In addition, the secondary winding structure of the transformer also can be modified as shown in 13A~13C.

Finally, while the invention has been described by way of example and in terms of the preferred embodiments, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A converter, comprising:
   a transformer comprising a primary winding and a secondary winding, each comprising a first end, a second end and a tapper;
   a first inductor comprising a first end connected to the tapper of the primary winding;
   a second inductor comprising a first end connected to the first end of the primary winding, and a second end;
   a first capacitor comprising a first end connected to the second end of the primary winding, and a second end;
   a second capacitor comprising a first end connected to the second end of the primary winding, and a second end;
   a first switch comprising a first terminal connected to the second end of the second inductor, a second terminal connected to the second end of the first capacitor, a control terminal coupled to a control signal, and a parasitical diode connected between the first and second terminals thereof;
   a second switch comprising a first terminal connected to the second end of the second capacitor, a second terminal connected to the first terminal of the first switch and the second terminal of the second inductor, a control terminal coupled to the control signal and a parasitical diode connected between the first and second terminals thereof, wherein the first and second switches operate according to the control signal; and
   a first rectifying device and a second rectifying device, connected to the first end and the second end of the secondary winding respectively;
   wherein the first rectifying device turns on according to conduction of the first switch and the second rectifying device turns on according to conduction of the second switch.

2. The converter as claimed in claim 1, wherein the first rectifying device comprises a first terminal connected to the first end of the secondary winding, a control terminal connected to the second end of the secondary winding, and a second terminal; and the second rectifying device comprises a first terminal connected to the second end of the secondary winding, a control terminal connected to the first end of the second end of the secondary winding, and a second terminal.

3. The converter as claimed in claim 2, further comprising a third inductor comprising a first end connected to the tapper of the secondary winding and a second end connected to a load.

4. The converter as claimed in claim 1, further comprising an output capacitor connected to the other end of the third inductor to regulate the output voltage of the power supply device.

5. The converter as claimed in claim 1, further comprising a first parasitical capacitor coupled between the first end and the second end of the first switch respectively, and a second parasitical capacitor coupled between the first end and the second end of the second switch respectively.

6. The converter as claimed in claim 2, further comprising a third inductor comprising a first end connected to the first terminal of the first rectifying device, and a second end connected to a load.

7. The converter as claimed in claim 6, further comprising a fourth inductor connected between the second end of the third inductor and the first terminal of the second rectifying device.

8. The converter as claimed in claim 1, wherein the first and second rectifying devices are diodes, the first rectifying device comprises a cathode connected to the first end of the secondary winding and an anode, and the second rectifying device comprises a cathode connected to the second end of the secondary winding and an anode connected to the anode of the first rectifying device.

9. The converter as claimed in claim 8, further comprising a third inductor comprising a first end connected to the first end of the secondary winding and the cathode of the first rectifying device, and a second end connected to a load.

10. The converter as claimed in claim 9, further comprising a fourth inductor connected between the second end of the third inductor and the second end of the secondary winding.

11. A converter, comprising:
a transformer comprising a primary winding and a secondary winding, each comprising a first end, a second end and a tapper;
a first inductor comprising a first end connected to the first end of the primary winding;
a second inductor comprising a first end connected to the second end of the primary winding, and a second end;
a first capacitor comprising a first end connected to the tapper of the primary winding, and a second end;
a second capacitor comprising a first end connected to the tapper of the primary winding and the first end of the first capacitor, and a second end;
a first switch comprising a first terminal connected to the second end of the second inductor, a second terminal connected to the second end of the first capacitor, a control terminal coupled to a control signal, and a parasitical diode connected between the first and second terminals thereof;
a second switch comprising a first terminal connected to the second end of the second capacitor, a second terminal connected to the first terminal of the first switch and the second terminal of the second inductor, a control terminal coupled to the control signal and a parasitical diode connected between the first and second terminals thereof, wherein the first and second switches operate according to the control signal; and
a first rectifying device and a second rectifying device, connected to the first end and the second end of the secondary winding respectively;
wherein the first rectifying device turns on according to conduction of the first switch and the second rectifying device turns on according to conduction of the second switch.

12. The converter as claimed in claim 11, wherein the first rectifying device comprises a first terminal connected to the first end of the secondary winding, a control terminal connected to the second end of the secondary winding, and a second terminal; and the second rectifying device comprises a first terminal connected to the second end of the secondary winding, a control terminal connected to the first end of the second end of the secondary winding, and a second terminal.

13. The converter as claimed in claim 12, further comprising a third inductor comprising a first end connected to the tapper of the secondary winding and a second end connected to a load.

14. The converter as claimed in claim 11, further comprising an output capacitor connected to the other end of the third inductor to regulate the output voltage of the power supply device.

15. The converter as claimed in claim 11, further comprising a first parasitical capacitor coupled between the first end and the second end of the first switch respectively, and a second parasitical capacitor coupled between the first end and the second end of the second switch respectively.

16. The converter as claimed in claim 12, further comprising a third inductor comprising a first end connected to the first terminal of the first rectifying device, and a second end connected to a load.

17. The converter as claimed in claim 16, further comprising a fourth inductor connected between the second end of the third inductor and the first terminal of the second rectifying device.

18. The converter as claimed in claim 11, wherein the first and second rectifying devices are diodes, the first rectifying device comprises a cathode connected to the first end of the secondary winding and an anode, and the second rectifying device comprises a cathode connected to the second end of the secondary winding and an anode connected to the anode of the first rectifying device.

19. The converter as claimed in claim 18, further comprising a third inductor comprising a first end connected to the first end of the secondary winding and the cathode of the first rectifying device, and a second end connected to a load.

20. The converter as claimed in claim 19, further comprising a fourth inductor connected between the second end of the third inductor and the second end of the secondary winding.

21. A converter, comprising:
a transformer comprising a primary winding and a secondary winding, each comprising a first end, a second end and a tapper;
a first inductor comprising a first end connected to the first end of the primary winding;
a second inductor comprising a first end connected to the tapper of the primary winding, and a second end;
a first capacitor comprising a first end connected to the second end of the primary winding, and a second end;
a second capacitor comprising a first end connected to the second end of the primary winding, and a second end;
a first switch comprising a first terminal connected to the second end of the second inductor, a second terminal connected to the second end of the first capacitor, a control terminal coupled to a control signal, and a parasitical diode connected between the first and second terminals thereof;
a second switch comprising a first terminal connected to the second end of the second capacitor, a second terminal connected to the first terminal of the first switch and the second terminal of the second inductor, a control terminal coupled to the control signal and a parasitical diode connected between the first and second terminals thereof, wherein the first and second switches operate according to the control signal; and
a first rectifying device and a second rectifying device, connected to the first end and the second end of the secondary winding respectively;

wherein the first rectifying device turns on according to conduction of the first switch and the second rectifying device turns on according to conduction of the second switch.

22. The converter as claimed in claim 21, wherein the first rectifying device comprises a first terminal connected to the first end of the secondary winding, a control terminal connected to the second end of the secondary winding, and a second terminal; and the second rectifying device comprises a first terminal connected to the second end of the secondary winding, a control terminal connected to the first end of the second end of the secondary winding, and a second terminal.

23. The converter as claimed in claim 22, further comprising a third inductor comprising a first end connected to the tapper of the secondary winding and a second end connected to a load.

24. The converter as claimed in claim 22, further comprising an output capacitor connected to the other end of the third inductor to smooth the output voltage of the power supply device.

25. The converter as claimed in claim 21, further comprising a first parasitical capacitor coupled between the first end and the second end of the first switch respectively, and a second parasitical capacitor coupled between the first end and the second end of the second switch respectively.

26. The converter as claimed in claim 22, further comprising a third inductor comprising a first end connected to the first terminal of the first rectifying device, and a second end connected to a load.

27. The converter as claimed in claim 26, further comprising a fourth inductor connected between the second end of the third inductor and the first terminal of the second rectifying device.

28. The converter as claimed in claim 21, wherein the first and second rectifying devices are diodes, the first rectifying device comprises a cathode connected to the first end of the secondary winding and an anode, and the second rectifying device comprises a cathode connected to the second end of the secondary winding and an anode connected to the anode of the first rectifying device.

29. The converter as claimed in claim 28, further comprising a third inductor comprising a first end connected to the first end of the secondary winding and the cathode of the first rectifying device, and a second end connected to a load.

30. The converter as claimed in claim 29, further comprising a fourth inductor connected between the second end of the third inductor and the second end of the secondary winding.

* * * * *